No. 620,618. Patented Mar. 7, 1899.
J. T. SMITH.
CULTIVATOR SHOVEL.
(Application filed July 11, 1898.)
(No Model.)
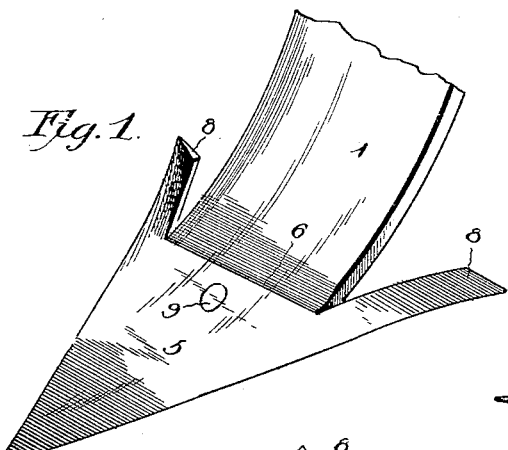
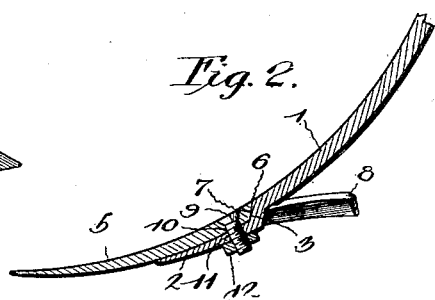
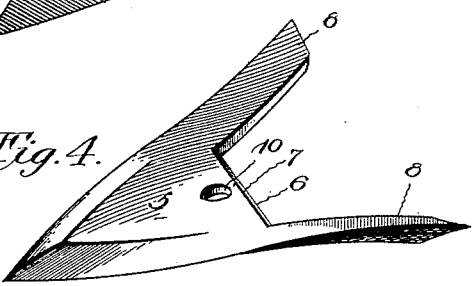
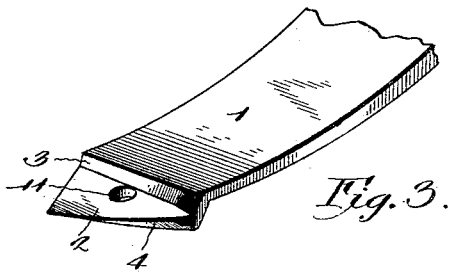
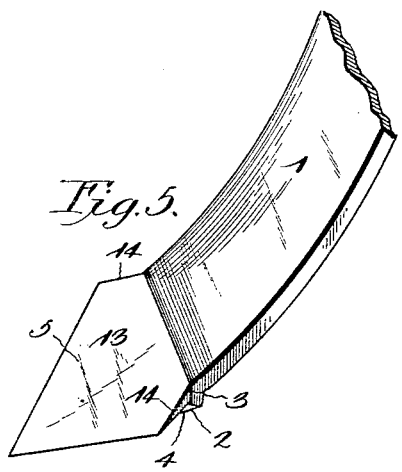
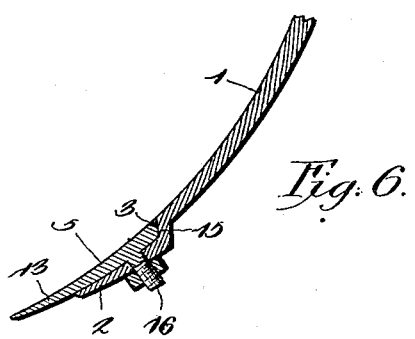
Witnesses
James T. Smith, Inventor.
By his Attorneys,

UNITED STATES PATENT OFFICE.

JAMES THOMAS SMITH, OF KIMBALL, KANSAS.

CULTIVATOR-SHOVEL.

SPECIFICATION forming part of Letters Patent No. 620,618, dated March 7, 1899.

Application filed July 11, 1898. Serial No. 685,632. (No model.)

*To all whom it may concern:*

Be it known that I, JAMES THOMAS SMITH, a citizen of the United States, residing at Kimball, in the county of Neosho and State of Kansas, have invented a new and useful Cultivator-Shovel, of which the following is a specification.

My invention relates to improvements in cultivator-shovels of that class which employ renewable points; and the object that I have in view is to provide an improved construction which may be used for scouring in cultivating the soil for various kinds of crops, which has its parts joined together in a manner to prevent the formation of an open space or crevice between the shovel and the point in the event of the point being sprung, thus insuring the retention of a flush surface between the shovel and the point, and which may be readily applied to any type of cultivator stock or foot.

A further object of the invention is to provide an improved construction of the point which shall deflect the soil and refuse laterally with respect to the shovel and which point is adapted to have a firm bearing on the shovel at a line separate from its cutting edges, thus preventing the edge of the point from breaking and preserving the flush surface between the point and the shovel.

With these ends in view the invention consists in the peculiar construction and arrangement of parts, which will be hereinafter fully described and claimed.

To enable others to understand the invention, I have illustrated the preferred embodiment thereof in the accompanying drawings, forming a part of this specification, and in which—

Figure 1 is a perspective view of the shovel, illustrating the application thereto of my improved winged point for use in foul ground. Fig. 2 is a vertical longitudinal sectional view through the shovel and point represented by Fig. 1. Fig. 3 is a detail perspective view of the shovel with the point removed therefrom. Fig. 4 is a detail perspective view of the point shown by Figs. 1 and 2. Fig. 5 is a perspective view illustrating the shovel with another style of point fitted thereto, and Fig. 6 is a longitudinal sectional view through the device shown by Fig. 5.

Like numerals of reference denote like and corresponding parts in each of the several figures of the drawings.

The shovel 1 is a single piece of steel of the generally rectangular form shown by the drawings, and it is formed with a triangular offset tang 2, which is an integral part of the shovel. This tang 2 is offset from the line or plane of the shovel, thereby forming a shoulder or ledge 3 between the shovel proper and its offset tang 2, and this shoulder on the working face of the shovel is beveled or inclined downwardly and rearwardly from the exposed face of the shovel to the front face of the triangular tang. The shoulder or ledge 3 extends across the full width of the shovel in a straight line which lies at right angles to the longitudinal axis of said shovel; but the inclination or bevel of this shoulder is in a direction downwardly and rearwardly from the face of the shovel to the tang.

The shovel proper is of large area to make it applicable to the different styles or types of stocks forming a part of a cultivator implement, and the shovel may be readily applied to the casting of any ordinary implement for secure union therewith in a proper manner.

To render the shovel useful for scouring the soil, and thereby prevent adhesion of the earth to the front working face of the shovel, I propose to case-harden the exposed working face of the shovel. The shovel may be and preferably is case-hardened throughout the entire area of its exposed front working surface—that is to say, from the edge of the beveled shoulder 3 to the upper extremity of the shovel and throughout the full width of the latter. My improved shovel is especially constructed for service in connection with points which are attachable to the tang 2 to lie flush with the exposed surface, and hence it is not necessary to heat the shovel and draw the temper thereof for the purpose of hammering or otherwise treating the surface of the shovel to sharpen it or adapt it for service in the ground. I am therefore able to case-harden the entire area of the working surface of the shovel, and this is especially advantageous in that provision is thus made for scouring the soil to prevent the soil adhering to the working surface of the shovel.

The edges of the tang 2 converge from the shoulder or ledge 3 to a point which lies in the axial line of the shovel, and these converging edges are beveled from the shoulder to the pointed extremity of the tang, as at 4, thereby adapting the tang to occupy an exceedingly compact relation to the rear side of the removable point.

The point 5 is of triangular form with a straight upper edge 6, that lies at right angles to the longitudinal axis of the shovel and corresponds to the line of the beveled shoulder or ledge 3 on the shovel, and this straight upper edge of the point is beveled or inclined downwardly and rearwardly, as at 7, thereby fashioning the point to fit compactly to the tang and shoulder on the shovel to have the working surface of the point lie flush with the corresponding face of the shovel. One of the important features of my invention resides in the formation of the bevels on the shoulder or ledge 3 and the straight upper edge 6 of the point, and in assembling the parts together these beveled edges of the shovel and point are caused to lap each other to secure a lapped joint which is not liable to be opened when the shovel is sprung, and thus obviates the formation of a crevice, in which roots, weeds, or grass may catch and lodge. This lodgment of the refuse or soil tends to interfere with the proper passage of the matter over the working faces of the shovel and point; but in my invention this is entirely overcome by the provision of the lapped joint, which maintains the normally flush relation of the point to the shovel under all conditions of service of the parts.

The point 5 is provided with integral wings 8, which are inclined in opposite directions from the upper corners of the point, said wings extending from the point 5 at the terminals of the straight beveled bearing edge 6 of the point. The side edges of the triangular point and the outer edges of the inclined wings 8 are beveled to produce the usual cutting edges on the point; but these cutting edges in my construction lie at some distance from the straight beveled bearing edge 6, thus constructing the point to have a firm bearing on the ledge or shoulder of the shovel without exposing said bearing edge to the breakage which is liable to take place along the cutting edge of the point. The improved construction of the point thus enables a firm solid bearing to be obtained on the shoulder of the shovel, and the necessary flush relation of the point and shovel is thus maintained notwithstanding any injury which may take place to the cutting edge of the point or the wings thereof. The point and shovel are united together by a bolt 9, which passes through coincident holes 10 11 in the point and shovel-tongue, respectively. The head of the bolt is fitted in a countersunk opening in the point to lie flush therewith, and the threaded extremity of this bolt receives a nut 12, that serves to firmly clamp the point and shovel together.

In Figs. 5 and 6 of the drawings I have illustrated another type of removable point, which is adapted to be applied to the offset tang and shoulder of the shovel to be used interchangeably with the winged point represented by Fig. 4. This removable point 13 has its side cutting edges intersected by reversely-inclined edges 14, and the upper straight edge of said point 13 is beveled downwardly and rearwardly, as at 15. The point is provided with a threaded shank 16, which is united rigidly to the point, within the straight beveled edge 15 thereof, and this point is adapted to be applied laterally against the tang 2 to have its beveled edge abut against the shoulder 3 and its threaded shank pass through the opening in the tang 2, the free end of said threaded shank receiving a nut to clamp the point firmly in place on the tang and secure the flush disposition of the point to the face of the shovel.

It is not necessary to sharpen the shovel because of the employment of the removable point. The case-hardened surface of the shovel may be retained, owing to the fact that heating and extraction of the temper of the shovel is obviated. Consequently the working surface of the shovel may remain smooth and intact at all times. It is evident that a broken or dulled point may be readily replaced, that large and small points may be used interchangeably on the shovel, and when the points become worn out the farmer can obtain a new set of points at a trifling cost, as I have estimated that the cost of a new set of points will be less than the cost of sharpening and repointing the old-style shovel.

My implement may be used for cultivating crops of various kinds—such, for example, as corn, beans, potatoes, and the like—and the employment of the winged point (shown by Fig. 4) is especially useful in cultivating blackberries, because the point will cut out between the rows, so that the weeds and the like may easily be gathered and burned.

By the formation of the shoulder or ledge in a straight line across the shovel, near the lower end thereof, ample space is provided on the rear side of the shovel for the application of the casting or foot of any style of cultivator, thus enabling the improved shovel or point to be used in different makes of cultivators. The employment of the lapped joint between the shovel and the point permits of the natural tendency of trash or roots to pass over the joint should the shovel or the point become sprung at the joint, thereby dispensing with sharp edges at the joint and obviating the lodgment of refuse or the soil therein. The improved construction of shovel and point provides for the manufacture of the device with a minimum amount and weight of metal, thereby insuring the production of the improved device at minimum cost and saving the farmer the labor of handling surplus metal.

The shoulder 3 extends the full width of the shovel, so as to support the point throughout its extent, and the wings 8 embrace the edges of the shouldered part 3, thereby relieving the fastening 9 of side strain.

Having thus described the invention, what I claim is—

1. A cultivator-shovel having its lower end portion offset forming an integral tang and a shoulder, the shoulder extending straight across the shovel from one edge to the other and inclined rearwardly and downwardly, and the tang having its edge forwardly and downwardly convergent and beveled, in combination with a point, removably fitted upon the tang and against the said shoulder, the upper edge of the point being inclined to secure a snug fit against the shoulder throughout its extent, and means for detachably connecting the point to the tang, substantially as described.

2. A cultivator-shovel having its lower end portion offset forming an integral tang and a shoulder, the shoulder extending straight across the shovel from one edge to the other, in combination with a point removably fitted upon the tang with its top edge abutting against the said shoulder, and formed with outwardly and upwardly extending wings embracing the edges of the shouldered portion of the shovel, and means for detachably connecting the point with the tang, substantially as specified.

In testimony that I claim the foregoing as my own I have hereto affixed my signature in the presence of two witnesses.

JAMES THOMAS SMITH.

Witnesses:
   V. S. KELSEY,
   A. B. ROBERTS.